(12) United States Patent
Seitz et al.

(10) Patent No.: US 7,828,454 B2
(45) Date of Patent: Nov. 9, 2010

(54) MACHINE TOOL COMPRISING A PROTECTIVE CABINET AND AN ILLUMINATION SYSTEM

(75) Inventors: Reinhold Seitz, Hopferau (DE); Joseph Hagn, Dornbirn (AT)

(73) Assignee: Deckel Maho Pfronten GmbH, Pfronten (DE)

( * ) Notice: Subject to any disclaimer, the term of this patent is extended or adjusted under 35 U.S.C. 154(b) by 91 days.

(21) Appl. No.: 11/837,246

(22) Filed: Aug. 10, 2007

(65) Prior Publication Data

US 2008/0025015 A1 Jan. 31, 2008

Related U.S. Application Data

(63) Continuation-in-part of application No. PCT/EP2006/001626, filed on Feb. 22, 2006.

(30) Foreign Application Priority Data

Feb. 22, 2005 (DE) .................. 20 2005 002 837

(51) Int. Cl.
*F21V 33/00* (2006.01)
(52) U.S. Cl. .................. 362/89; 362/155
(58) Field of Classification Search .................. 362/89, 362/133, 154, 155
See application file for complete search history.

(56) References Cited

U.S. PATENT DOCUMENTS

| | | | | |
|---|---|---|---|---|
| 5,070,273 A | * | 12/1991 | van den Bogert et al. | ... 313/607 |
| 5,580,155 A | * | 12/1996 | Hildebrand et al. | ......... 362/133 |
| 5,676,459 A | * | 10/1997 | Bedford et al. | ............. 362/390 |
| 6,384,402 B1 | * | 5/2002 | Hair et al. | ............... 250/223 R |
| 6,469,435 B1 | * | 10/2002 | Seibold et al. | ............... 313/493 |
| 6,814,462 B1 | * | 11/2004 | Fiene | ......................... 362/133 |
| 2002/0163311 A1 | | 11/2002 | Hitzschke et al. | |
| 2004/0164681 A1 | * | 8/2004 | Custodis et al. | ............. 313/635 |

FOREIGN PATENT DOCUMENTS

| | | |
|---|---|---|
| CA | 2475580 A1 | 1/2005 |
| DE | 29806591 U1 | 10/1998 |
| DE | 10016714 C2 | 10/2001 |
| DE | 10048187 A1 | 4/2002 |
| EP | 1389711 A2 | 2/2004 |

OTHER PUBLICATIONS

International Search Report—Serial No. PCT/EP2006/001626, Dated: Feb. 22, 2006.
German Search Report—No. 20 2005 002 837.1, Dated: Aug. 9, 2005.

* cited by examiner

*Primary Examiner*—John A Ward
(74) *Attorney, Agent, or Firm*—The Maxham Firm

(57) ABSTRACT

A machine tool having a protective cabinet and an illumination system comprising at least one discharge lamp installed in the interior space of the protective cabinet. The discharge lamp is formed as a flat lamp radiating over a large area with a uniform luminous intensity and disposed on a cabinet wall in order to obtain an enhanced illumination of the entire workspace of the machine as well as of the interior space of the protective cabinet.

15 Claims, 1 Drawing Sheet

MACHINE TOOL COMPRISING A PROTECTIVE CABINET AND AN ILLUMINATION SYSTEM

FIELD OF THE INVENTION

The invention relates generally to a machine tool comprising a protective cabinet and an illumination system comprising at least one discharge lamp installed in the interior space of the protective cabinet.

DISCUSSION OF PRIOR ART

Modern machine tools and machining centers regularly comprise a protective cabinet surrounding the workspace and, where required, also surrounding the secondary devices during operation. To enable access to the workspace sliding doors are provided which are movable rectilinearly or on round guides. The side walls as well as the sliding doors comprise viewing windows in respectively suitable arrangements and sizes in order to enable an observation of the operation and the progress of the work. For work within the workspace with the sliding doors opened as well as for monitoring the operating cycles, one or, in most cases, a plurality of lamps are provided at suitable positions of the inner wall of the protective cabinet, these lamps having a sufficient lighting efficiency to securely monitor and trace machining operations even when the atmosphere of the workspace is contaminated by droplet fog caused by the lubrication and cooling fluids or by the finest chips.

Illumination systems designed for the protective cabinets of machine tools generally comprise one or more built-in lamps as described, for example, in EP 1 389 711. Such built-in lamps are individually, or in a plurality, mounted in the interior space of the protective cabinet on one cabinet wall and comprise elongated gas discharge lamps formed as so-called fluorescent lamps and mounted in plurality adjacent to each other in a housing containing the required electrical circuits. These fluorescent lamps radiate over a wide area and with a uniform luminous density, at least in their longitudinal extension. Depending on the type the height of the built-in lamps is approximately 100 mm so that they protrude into the interior space of the cabinet in the installation height when they are installed on the inner side of a cabinet wall. Due to the dimensions of the built-in lamps the selection of their positioning is limited since only certain positions in the respective workspace within the protective cabinet are suitable for placing and mounting such elongated lighting elements. The lamps are usually integrated in the upper or lateral corner sections of the protective cabinet, and reductions with respect to optimum illumination of the workspace caused by the use of fluorescent lamps have to be tolerated.

From patent publication US 2002/0163311 A1, a discharge lamp designed for dielectrically impeded discharges is known which may, for example, be used for a flat panel display or a display designed in LCD technology. This discharge lamp comprises a bottom plate, a transparent top plate and a discharge space filled with a discharge medium disposed between the two plates. A set of electrodes is provided for generating dielectrically impeded discharges in the discharge medium. Support elements are formed as integrated components of the cover plate and have a tapered contour in the direction toward the bottom plate. The support elements are a large number of support protrusions uniformly distributed over the entire active surface of the lamp and consist of glass or another transparent material.

In DE 100 16 714 C2 a flat lamp is described in which a plurality of uniformly distributed light emitting diodes are disposed in a closed, flat glass housing and positively fastened between the front and rear sides.

SUMMARY OF THE INVENTION

It is a purpose of embodiments of the invention to provide an illumination system for a machine tool enabling an enhanced illumination of the workspace as well as of the remaining interior space of a protective cabinet.

In connection with a machine tool comprising a protective cabinet and an illumination system comprising at least one discharge lamp which is installed in the interior space of the protective cabinet on one cabinet wall and formed as a flat lamp radiating over a large area, the purpose is, according to the invention, met by the flat lamp comprising a flat luminous element radiating with a uniform luminous intensity over its entire surface and is encapsulated in a flat, gas-tight housing including a transparent plate on one side.

In the illumination system according to the invention flat lamps may be used which function according to the principle already described in the cited US 2002/0163311 A1 or in DE 100 48 187 A. For the results and effects aspired according to the invention it is important that the flat lamps used have sufficiently large dimensions in one plane and radiate uniformly with a high luminance over their entire active area. The small overall thickness of these flat lamps, which should not exceed 30 mm, gives rise to the possibility to position the respective flat lamp in a predetermined area of an inner wall of the protective cabinet via suitable fixing means. Since the flat lamp only protrudes into the internal space of the cabinet by an amount corresponding to its thickness, the internal space of the protective cabinet and thus the workspace is only insignificantly reduced. This creates the option to position one or a plurality of flat lamps in the areas of the respective cabinet walls or the cabinet ceiling which guarantee an optimum illumination of the entire workspace as well as, where appropriate, secondary spaces within the protective cabinet.

Depending on the type of machine and the size or contour of the protective Cabinet the number and position of the respectively-used flat lamps may be selected in view of an all around and shadowless illumination of the workspace. The shape of the respectively-used flat lamps may be polygonal, circular, oval, or arcuate. Aside from that, so-called light ribbons are feasible in which the lamps are individually, or in a plurality mounted behind each other on the cabinet walls or the cabinet ceiling as a narrow, continuous, or discontinuous luminescent strip.

To avoid a reduction of the interior space of the protective cabinet the flat lamps according to the invention may also be installed in indentations in one or more cabinet walls or in the cabinet ceiling, a permanent sealing being required in that case.

A preferred embodiment of the flat lamps used according to the invention comprises a relatively extensive luminous element radiating with a, to the largest extent, uniform luminance over its entire surface and encapsulated in a rigid, flat, gas-tight housing provided with a transparent plate on one side.

BRIEF DESCRIPTION OF THE DRAWING

The advantages, benefits, and features of the invention will become more clear from the following detailed description when read in conjunction with the accompanying drawing, in which.

DETAILED DESCRIPTION OF THE PREFERRED EMBODIMENTS

Figure 1:
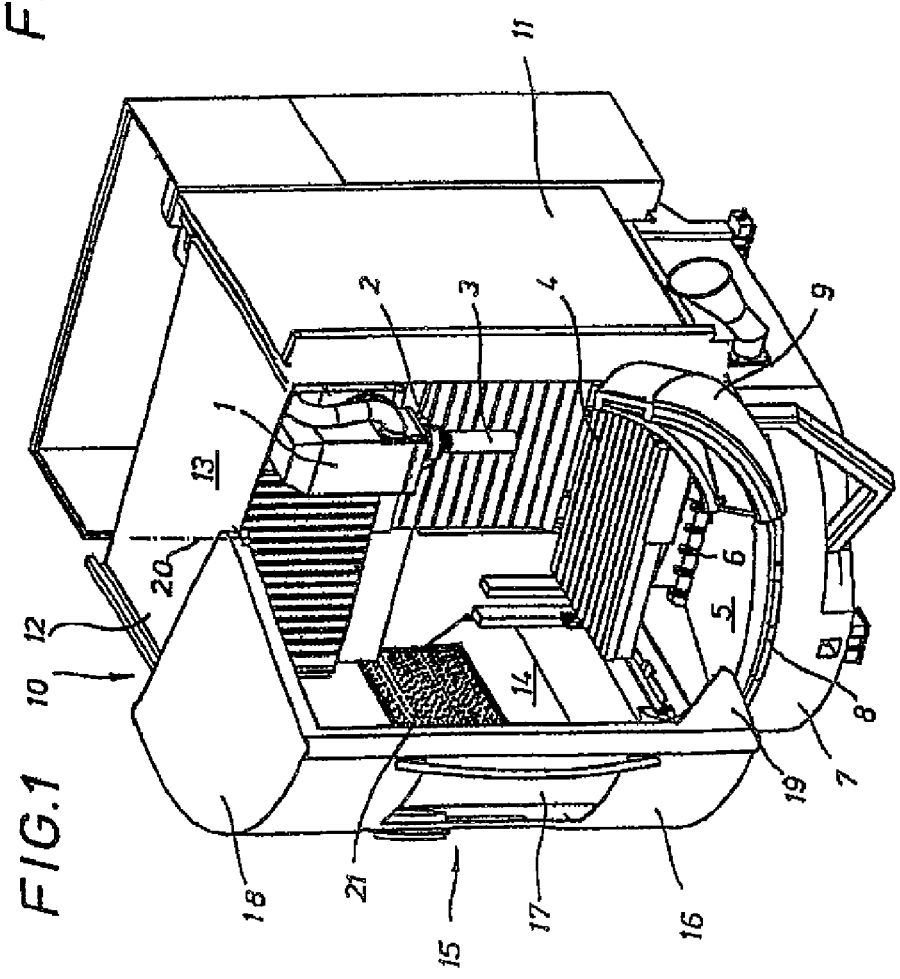
FIG. 1 is a perspective view of a milling and drilling machine in accordance with the invention, comprising a protective cabinet and a lateral flat lamp.

FIG. 1 shows a program controlled milling and drilling machine which is only to be regarded as an example for an efficient arrangement of a flat lamp. The machine tool comprises machining head 1 which is shiftable on a column along two horizontal coordinate axes by means of a motor, a tool 3 being clamped in vertical work spindle 2 of the machining head. Workpiece table 4 is supported by a panel shiftable along the vertical coordinate axis on the front side of the machine column by means of a motor. The table surface defines the maximum workspace. Rotating spindle 6 for chip discharge is disposed in half-round bottom pan 5 below workpiece table 4. Toward the front side, bottom pan 5 is limited by a half-round face 7 carrying a guide rail 8 displaced downwardly on its outer side.

Protective cabinet 10 consists of two rear side walls 11, 12, covering wall 13 connected between the side walls, and front side wall 14 extending a distance from workpiece table 4 and laterally covering the workspace. Further, protective cabinet 10 shown is provided with a so-called round door 15 comprising cylinder-segment shaped side wall 16 which includes window 17, and upper, circle-segment shaped cover plate 18. Lower inclined shoulder 19 has a sliding surface which leads into the bottom pan and shiftably supports round door 15 on lower guide rail 8. Furthermore, upper cover plate 18 is guided or supported so as to be pivotable about vertical axis 20.

Figure 2:
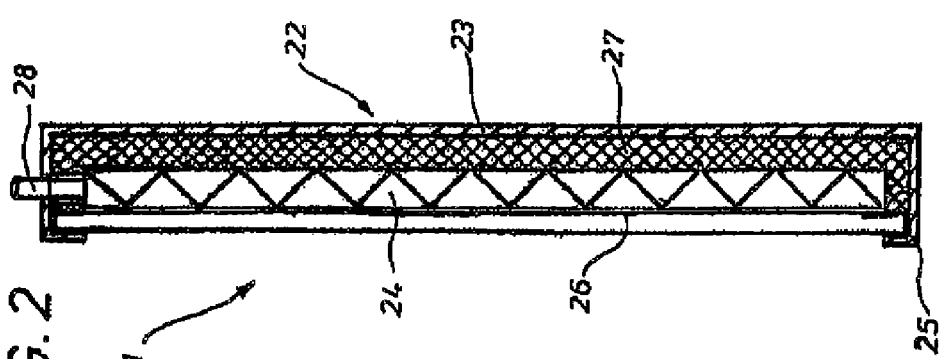
FIG. 2 is a cross sectional view of a flat lamp as employed in the FIG. 1 embodiment.

As can be seen in FIG. 1, large-area flat lamp 21, which is shown in a cross Sectional view in FIG. 2, is attached to the inner side of side wall 14. The flat lamp comprises a flat, rigid all around frame 22, preferably made of metal such as refined steel, with continuous rear wall 23 and large-area glow discharge lamp 24 disposed in frame 22 in a shock proof manner. A shock proof, transparent front cover plate 26, for example, a laminated glass panel, is fastened within the frame 22 and surrounded by its angled edge 25 on all sides.

The free interior space of flat lamp 21 is completely filled with synthetic resin 27. The entry of dust, liquids, vapours, and gasses is securely prevented in this way and, if required, by other, or additional, sealing means.

The flat lamp may be attached to the inner side of side wall 14 as a separate component, and the electric control elements and circuits may be disposed on the outer side of the side wall and connected to glow discharge lamp 24 via pressure-sealed cables 28. As can be seen in FIG. 1, flat lamp 21 is disposed directly adjacent to the workspace above the workpiece table. Since the luminance of the flat lamp is, to the largest extent, uniform over its entire surface an optimum illumination of the workspace is obtained so that the respective operator can accurately observe the machining operations through window 17 of round door 15 when the round door is closed.

Figure 3:
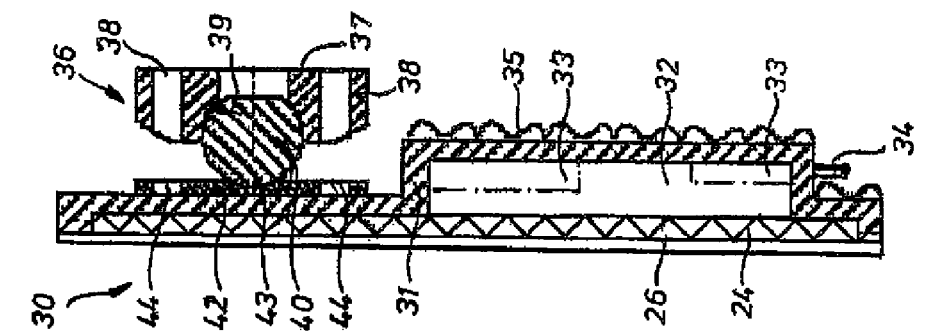
FIG. 3 is a cross sectional view of another embodiment of a flat lamp for use in the invention.

The alternative embodiment of flat lamp 30, shown in cross section in FIG. 3, substantially corresponds to the embodiment according to FIG. 2, and identical components are designated by the same numerals. For this flat lamp also a glow discharge lamp 24, working in accordance with the functional principle cited as known in the introduction, is used. Glow discharge lamp 24 is mounted in closed housing 31 in a shock-proof manner. On one side housing 31 comprises chamber 32 in which electric or electronic switching elements 33 are accommodated in a protected manner. Supply cable 34 leads into chamber 32. Corrugated thin sheet 35, preferably made of a heat-conducting material such as a light metal, is fixed on the bottom plate of housing 31, which is made of sheet metal or plastics to promote heat dissipation from the interior of the housing. For enhanced heat dissipation the bottom plate or other wall elements, or both, may be profiled, for example, corrugated or fan-folded. The wall elements may conveniently be formed of light metal. Protruding cooling fins may also be used.

In the flatter region adjacent to chamber 32, support 36 is provided by which lamp 30 is adjustably attached to a component of the machine tool. Support 36 comprises support element 37 acting as a spherical shell having lateral bores 38 and central recess 39 formed with a spherical surface. Sphere 40 is disposed in spherical recess 39. Plate 42 is fixedly connected to the rear wall of housing 31, the plate having recess 43 and two adjacent bores 44 in its central region. The bores are aligned with bores 38 in support element 37 and are capable of accommodating bolts. Support 36 forms an adjustable spherical surface or spherical shell bearing which can, for example, be fixed by bolts.

The arrangement of the flat lamp is, of course, not limited to the position illustrated in the drawings. Rather narrow flat lamps may also be positioned at other suitable positions of the side walls or the rear column wall individually or in combination with large-area flat lamps. It is important that the respective flat lamps do only protrude into the interior space of the protective cabinet by a small amount, preferably no more than about 30 mm, so that the free moving space inside of the protective cabinet is not limited while the illumination of the workspace is, at the same time, optimized.

What is claimed is:

1. A machine tool comprising:
   a protective cabinet having walls and a ceiling; and
   an illumination system comprising at least one discharge lamp installed on a wall in the interior space of said protective cabinet;
   said discharge lamp being formed as a flat lamp configured to radiate over a large area, said flat lamp comprising a flat gas-tight housing with a bottom plate, a flat transparent top plate, a discharge space between the bottom plate and top plate filled with a discharge medium, and electrodes producing a dielectrically impeded discharge in the discharge medium and radiation with a uniform luminous intensity over the entire surface of the top plate, said discharge lamp being sealed against the intrusion of gases and liquids and particulates produced during machining processes conducted within the protective cabinet.

2. The machine tool according to claim 1, wherein said flat lamp has a thickness of approximately up to 30 mm and an angled, round, or oval shape.

3. The machine tool according to claim 1, wherein at least one flat lamp is mounted on the inner side of a cabinet wall or on the ceiling of said protective cabinet.

4. The machine tool according to claim 2, wherein at least one flat lamp is mounted on the inner side of a cabinet wall or on the ceiling of said protective cabinet.

5. The machine tool according to claim 1, wherein at least one wall of said protective cabinet is formed with an indentation and at least one flat lamp is installed in said indentation in a cabinet wall or in the cabinet ceiling in a sealed manner.

6. The machine tool according to claim 3, wherein at least one wall of said protective cabinet is formed with an indentation and at least one flat lamp is installed in said indentation in a cabinet wall or in the cabinet ceiling in a sealed manner.

7. The machine tool according to claim 1, wherein said flat lamp is disposed on a cabinet wall in a plane-parallel orientation or in an adjustable oblique posture.

8. The machine tool according to claim 3, wherein said flat lamp is disposed on a cabinet wall in a plane-parallel orientation or in an adjustable oblique posture.

9. The machine tool according to claim 7, wherein said flat lamp is mountable to said protective cabinet via adjustable supports.

10. The machine tool according to claim 8, wherein said flat lamp is mountable to said protective cabinet via adjustable supports.

11. The machine tool according to claim 9, said supports comprise fixable spherical surface bearings.

12. The machine tool according to claim 10, said supports comprise fixable spherical surface bearings.

13. The machine tool according to claim 1, and further comprising elements for enhanced heat dissipation mounted to said housing of said flat lamp.

14. The machine tool according to claim 1, and further comprising a flat chamber in said housing of said flat lamp for accommodating electric/electronic switching element.

15. The machine tool according to claim 13, and further comprising a flat chamber in said housing of said flat lamp for accommodating electric/electronic switching elements.

* * * * *